United States Patent
Natanzon

(10) Patent No.: US 10,108,507 B1
(45) Date of Patent: Oct. 23, 2018

(54) ASYNCHRONOUS COPY ON WRITE

(75) Inventor: Assaf Natanzon, Ramat-Gan (IL)

(73) Assignee: EMC IP Holding Company, Hopkinton, MA (US)

( * ) Notice: Subject to any disclaimer, the term of this patent is extended or adjusted under 35 U.S.C. 154(b) by 1003 days.

(21) Appl. No.: 13/077,280

(22) Filed: Mar. 31, 2011

(51) Int. Cl.
*G06F 11/20* (2006.01)
*G06F 11/14* (2006.01)

(52) U.S. Cl.
CPC ...... *G06F 11/2074* (2013.01); *G06F 11/1402* (2013.01); *G06F 11/1458* (2013.01); *G06F 11/1471* (2013.01); *G06F 2201/84* (2013.01); *G06F 2201/855* (2013.01)

(58) Field of Classification Search
None
See application file for complete search history.

(56) References Cited

U.S. PATENT DOCUMENTS 7,617,414 B2 * 11/2009 Becker et al. .................. 714/15
2007/0162513 A1 * 7/2007 Lewin et al. ................. 707/200

* cited by examiner

*Primary Examiner* — Midys Rojas
*Assistant Examiner* — Marwan Ayash
(74) *Attorney, Agent, or Firm* — Krishnendu Gupta; Robert Kevin Perkins

(57) ABSTRACT

A method, system, and computer program product for receiving a request to roll an image to a point in time by reading data from a journal, applying data from the journal to create a asynchronous copy on write image at the requested point in time, creating a virtual image data structure, and allowing writes to be cached in a journal based replication appliance.

17 Claims, 14 Drawing Sheets

US 10,108,507 B1

ASYNCHRONOUS COPY ON WRITE

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A method, system, and computer program product for receiving a request to roll an image to a point in time by reading data from a journal, applying data from the journal to create a asynchronous copy on write image at the requested point in time, creating a virtual image data structure, and allowing writes to be cached in a journal based replication appliance.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION

Figure 1:
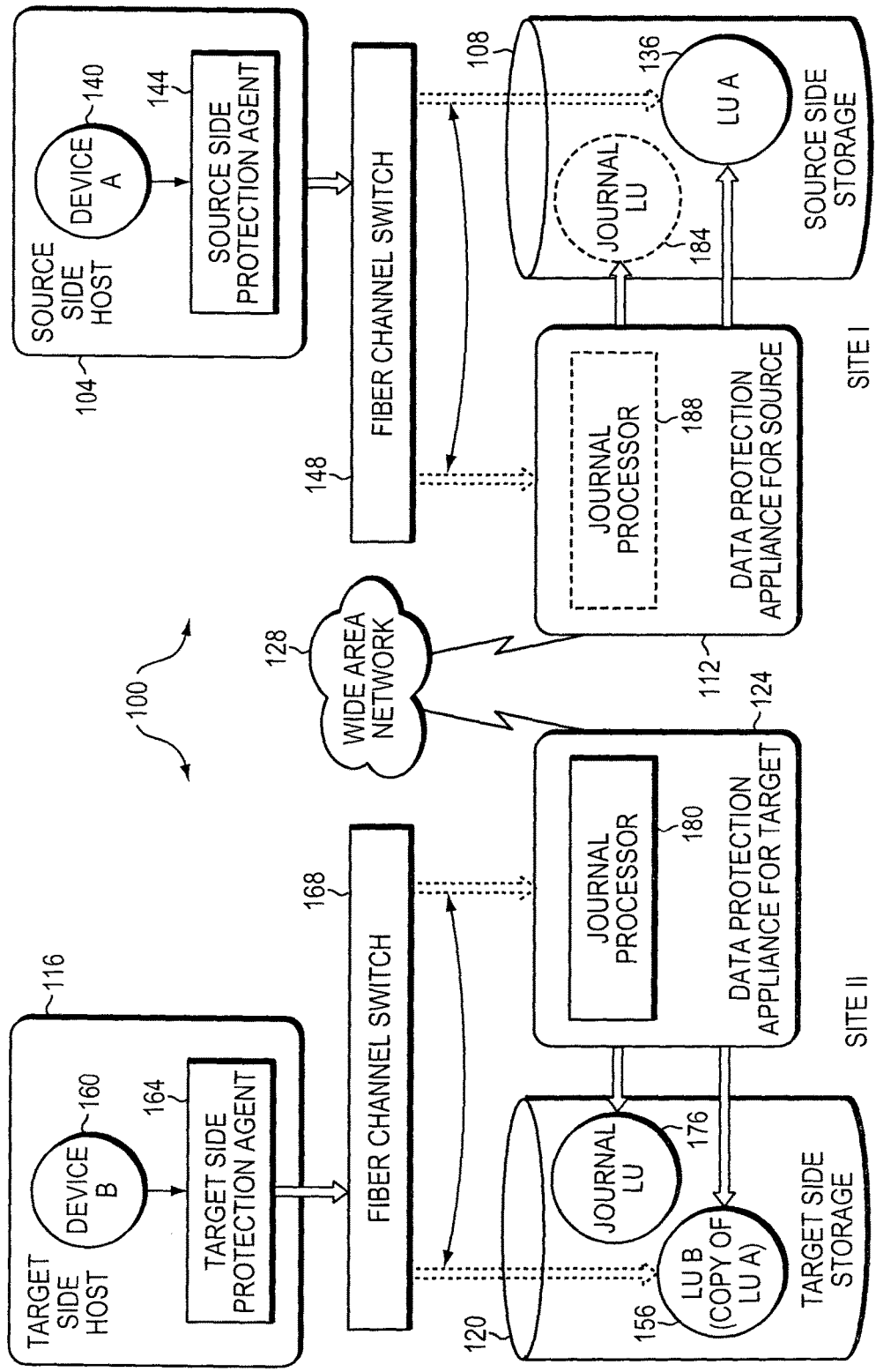
FIG. 1 is a simplified illustration of a data protection system, in accordance with an embodiment of the present invention.

In some embodiments of the current disclosure, journal based recovery systems may provides user logged access mode. In these embodiments, logged access mode may be where each IO is done on copy on first write. In other embodiments, the recovery system may also provide a virtual access mode where all reads and write flow thought the appliance. In these other embodiments, reads are read from the journal if needed and writes go to another journal. In other embodiments, the recovery system may provide a roll mode where the system moves from virtual access mode to logged access mode. In these other embodiments, the idea is to use the virtual access mode even when in logged access mode, keep a list of the changes not yet applied to the system in the appliance memory. In some of these embodiments, a read may check if the area has changed and if not the splitter will read directly from the volume. In some embodiments, if the area has changed the read flow will work as the virtual access mode. In other embodiments, writes may be written in a continuous stream in the journal and immediately answered. In certain embodiments, the writes will be asynchronously distributed to the user volume.

The following definitions are employed throughout the specification and claims.

BACKUP SITE—a facility where replicated production site data is stored; the backup site may be located in a remote site or at the same location as the production site;

CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—Data Protection Appliance a computer or a cluster of computers, or a set o processes that serve as a data protection appliance, responsible for data protection services including inter alia data replication of a storage system, and journaling of I/O requests issued by a host computer to the storage system;

RPA—replication protection appliance, is another name for DPA.

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

JOURNAL—a record of write transactions issued to a storage system; used to maintain a duplicate storage system, and to rollback the duplicate storage system to a previous point in time;

LOGICAL UNIT—a logical entity provided by a storage system for accessing data from the storage system;

LUN—a logical unit number for identifying a logical unit;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

SNAPSHOT-a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side;

WAN—a wide area network that connects local networks and enables them to communicate with one another, such as the Internet.

SPLITTER/PROTECTION AGENT: may be an agent running either on a production host a switch or a storage array which can intercept IO and split them to a DPA and to the storage array, fail IO redirect IO or do any other manipulation to the IO.

VIRTUAL VOLUME: may be a volume which is exposed to host by a virtualization layer, the virtual volume may be span across more than one site DISTRIBUTED MIRROR: may be a mirror of a volume across distance, either metro or geo, which is accessible at all sites.

BLOCK VIRTUALIZATION: may be a layer, which takes backend storage volumes and by slicing concatenation and striping create a new set of volumes, which serve as base volumes or devices in the virtualization layer MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

GLOBAL FAIL ALL MODE: may be a mode of a volume in the virtual layer where all write and read IOs virtual layer are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference.

A discussion of image access may be found in U.S. patent application Ser. No. 12/969,903 entitled "DYNAMIC LUN RESIZING IN A REPLICATION ENVIRONMENT" filed on Dec. 16, 2010 assigned to EMC Corp., which is hereby incorporated by reference.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.
Fail a SCSI command by returning an error return code.
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LUB.

During a recovery mode, DPA 124 undoes the write transactions in the journal, so as to restore storage system 120 to the state it was at, at an earlier time.

As described hereinabove, in accordance with an embodiment of the present invention, LUB is used as a backup of LU A. As such, during normal production mode, while data written to LU A by host computer 104 is replicated from LU A to LUB, host computer 116 should not be sending I/O requests to LUB. To prevent such I/O requests from being sent, protection agent 164 acts as a target site protection agent for host Device B and fails I/O requests sent from host computer 116 to LUB through host Device B.

In accordance with an embodiment of the present invention, target storage system 120 exposes a logical unit 176, referred to as a "journal LU", for maintaining a history of write transactions made to LUB, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LUB. Specifically, journal processor 180 (i) enters write transactions received by DPA 124 from DPA 112 into the journal, by writing them into the journal LU, (ii) applies the journal transactions to LUB, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
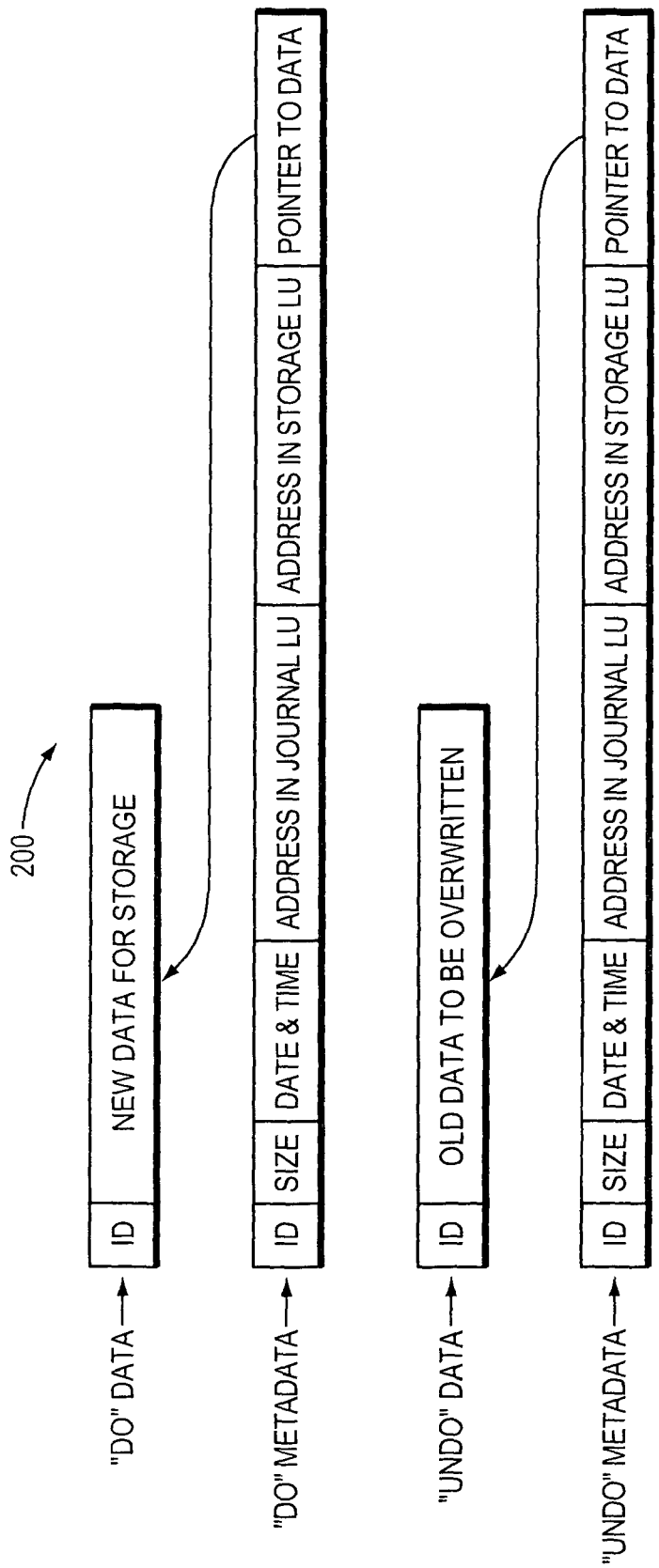
FIG. 2 is a simplified illustration of a write transaction for a journal, in accordance with an embodiment of the present invention.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
one or more identifiers;
a time stamp, which is the date & time at which the transaction was received by source side DPA 112;
a write size, which is the size of the data block;
a location in journal LU 176 where the data is entered;
a location in LUB where the data is to be written; and the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LUB. A second stream, referred to as an DO METADATA stream, includes metadata for the write transaction, such as an identifier, a date & time, a write size, a beginning address in LUB for writing the new data in, and a pointer to the offset in the do stream where the corresponding data is located. Similarly, a third stream, referred to as an UNDO stream, includes old data that was overwritten in LUB; and a fourth stream, referred to as an UNDO METADATA, include an identifier, a date & time, a write size, a beginning address in LUB where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LUB, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LUB. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Image Access Section

Before describing exemplary embodiments of the invention, some information is provided for conventional continuous data protection systems having journaling and a replication splitter. A replication may set refer to an association created between the source volume and the local and/or remote target volumes, and a consistency group contains one or more replication sets. A snapshot may be the difference between one consistent image of stored data and the next. The exact time for closing the snapshot may determined dynamically depending on replication policies and the journal of the consistency group.

In synchronous replication, each write may be a snapshot. When the snapshot is distributed to a replica, it may be stored in the journal volume, so that is it possible to revert to previous images by using the stored snapshots. As noted above, a splitter may mirror writes from an application server to LUNs being protected by the data protection appliance. When a write is requested from the application server it may be split and sent to the appliance using a host splitter/driver (residing in the I/O stack, below any file system and volume manager, and just above any multipath driver (such as EMC POWERPATH), through an intelligent fabric switch, through array-based splitter, such as EMC CLARiiON.

There may be a number of image access modes. Image access may be used to restore production from the disaster recovery site, and to roll back to a previous state of the data. Image access may be also to temporarily operate systems from a replicated copy while maintenance work is carried out on the production site and to fail over to the replica. When image access is enabled, host applications at the copy site may be able to access the replica.

In virtual access, the system may create the image selected in a separate virtual LUN within the data protection appliance. While performance may be constrained by the appliance, access to the point-in-time image may be nearly instantaneous. The image may be used in the same way as logged access (physical), noting that data changes are temporary and stored in the local journal. Generally, this type of image access is chosen because the user may not be sure which image, or point in time is needed. The user may access several images to conduct forensics and determine which replica is required. Note that in known systems, one cannot recover the production site from a virtual image since the virtual image is temporary. Generally, when analysis on the virtual image is completed, the choice is made to disable image access.

If it is determined the image should be maintained, then access may be changed to logged access using 'roll to image.' When disable image access is disabled, the virtual LUN and all writes to it may be discarded.

In an embodiment of virtual access with roll image in background, the system first creates the image in a virtual volume managed by the data protection appliance to provide rapid access to the image, the same as in virtual access. Simultaneously in background, the system may roll to the physical image. Once the system has completed this action, the virtual volume may be discarded, and the physical volume may take its place. At this point, the system continues to function as if logged image access was initially selected. The switch from virtual to physical may be transparent to the servers and applications and the user may not see any difference in access. Once this occurs, changes may be read from the physical volume instead of being performed by the appliance. If image access is disabled, the writes to the volume while image access was enabled may be rolled back (undone). Then distribution to storage may continue from the accessed image forward.

In some embodiment in physical logged access, the system rolls backward (or forward) to the selected snapshot (point in time). There may be a delay while the successive snapshots are applied to the replica image to create the selected image. The length of delay may depend on how far the selected snapshot is from the snapshot currently being distributed to storage. Once the access is enabled, hosts may read data directly from the volume and writes will be handled through the DPA. The host may read the undo data of the write and the appliance will store the undo data in a logged access journal. During logged access the distribution of snapshots from the journal to storage may be paused. When image access is disabled, writes to the volume while image access was enabled (tracked in the logged access journal) may be rolled back (undone). Then distribution to storage may continue from the accessed snapshot forward.

Disable image access may mean changes to the replica will be discarded or thrown away. It may not matter what type of access was initiated, that is, logged or another type, or whether the image chosen was the latest or an image back in time. Disable image access effectively says the work done at the disaster recovery site is no longer needed.

Delta Marking

In some embodiments, a delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g. DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

Asynchronous Copy on Write

In some embodiments, in physical access mode, it may be necessary to read an undo of a write before you write the data. In certain embodiments, writes are cached and reads are cache misses; that is the read may read from the backend storage drives thus read miss may cause high latency compared to a cached write. In some embodiments, accessing copy on write snapshots may be slow due to the cache read misses, while the writes to the original volume may be quick.

In some embodiments of the current disclosure, the replication appliance may be in physical access mode using virtual access mode mechanisms. In these embodiments, the data from the journal may be applied to the volume and the volume is currently at the point in time the user requested, letting the user or application access the volumes. In these embodiments, a virtual data image may be used to enable writes to be performance without a need for a "copy on write", thus avoiding unnecessary cache read misses. In these embodiments, the virtual data image may enable most reads to be performed as quickly as reads that happen on a production volume by sending the reads directly to the storage. In these embodiments, writes may also continue to be applied to the image and the image and rolled by a background process allowing the virtual image may be very close to the current physical image, such that most reads may go directly to the physical image.

In some embodiments, the virtual access data structure may contain writes which were applied to the volume from the host and may not yet have been applied to the physical user volume by the appliance, the data structure has two parts. In certain embodiments, the virtual access data structure may contain a meta data part. In these embodiments, the meta data part may contain the offsets and the volumes which changed, for each location which changes the data structure and may include a pointer to the location in the journal where the changed data is kept, and a pointer to the data cache if the data is still cached in the replication appliance. In further embodiments, the virtual access data structure may contain a data part. In these embodiments, the data part may contain portions of the data which may have changed and not yet have been applied to the volumes. In some embodiments, once the cache is full, new data may be kept in the journal.

In some embodiments, when the image is created the image may be rolled, similar to that in physical access. In some of these embodiments, before user can access the image the system may apply the changes either from the journal do stream or the journal undo stream (depending on the point in time the user requested), and the image may be exposed to the user and the application. In certain embodiments, the system may maintain several data structures in memory, and the data structure may be backed up on a journal on a LU device. In other embodiments, the data structure may be mirrored in a second appliance.

In some embodiments, in virtual access mode, a read notify is sent to the RPA, write before read may occur (which may a write command containing the data which is currently on the production volume). In these embodiments, the read may occur and the appliance may create a response containing the data in the virtual image, based on the write before read data. In some embodiments, the write before the read data may contains the data currently in the physical volume. In these embodiments, this data may be based on the data applied to the image after the physical volume's current point in time, where some data may be contained in the journal.

In other embodiments of the current disclosure, a command may be sent requesting whether the read is in RPA cache, or journal, which may serve as the read notify. In other embodiments, if the read is not in the cache of the RPA and not in the journal (i.e. the data in the production volume is the data that should be read) the splitter may send the IO down the IO stack. If the read is in the cache or journal, the splitter will send the write before read command and send the read to the RPA. The RPA will either build the read from the data structure in the memory or read the data from the journal to create the read. In these embodiments, the read will often be executed much quicker as the read may most often be in the storage, and if not in the storage, in the data structure of the RPA, and may least often need to be read from the journal.

Figure 3:
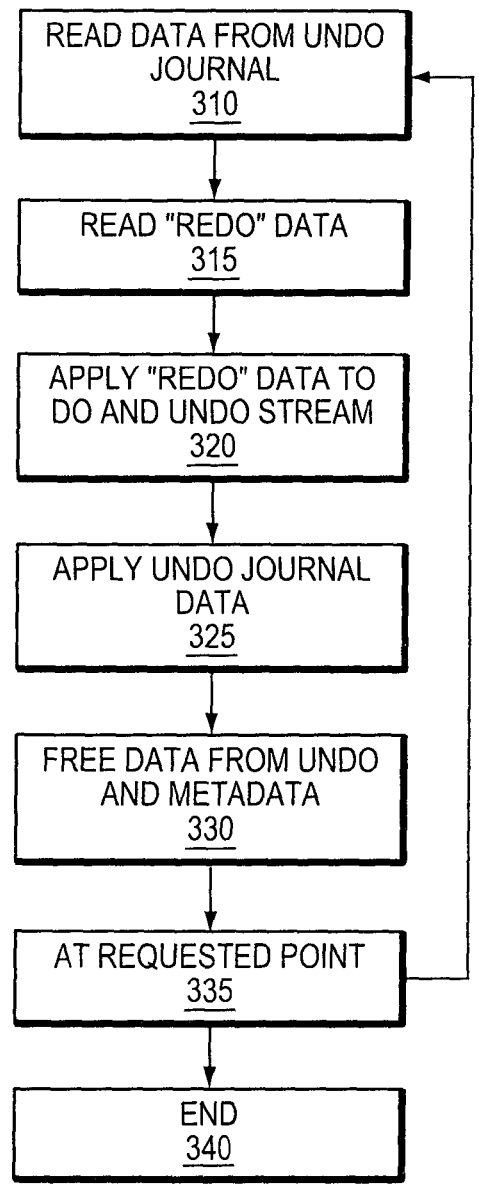
FIG. 3 is a simplified illustration of a method of moving to a requested point in time, in accordance with an embodiment of the present invention.
Figure 4:
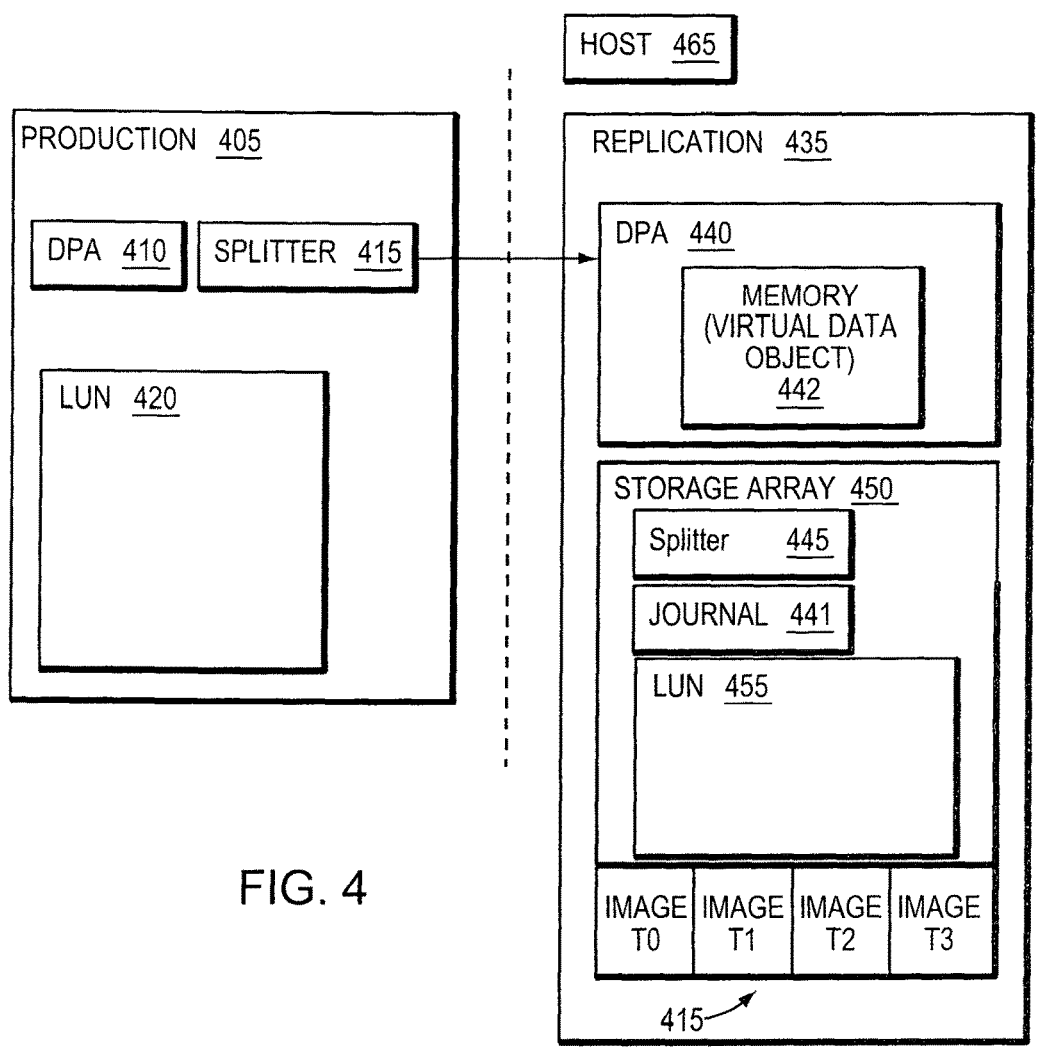
FIG. 4 is a simplified illustration of a production site and a replication site, in accordance with an embodiment of the present invention.

In some embodiments, when a write arrives, all the open I/Os from the appliance can go to the journal or go to the cache, i.e. write may be mirrored to another RPA appliance which has a mirrored cache. In certain embodiments, in the background, data is read from the image access do stream and applied to the storage, and erased from the virtual access data structure Refer now to the example embodiments of FIGS. 3 and 4. In the embodiments of FIGS. 3 and 4, a user may request the image be rolled to a particular image and the image may be before the current point of time of the image. Data may be read from the undo journal (step 310). "Redo" data may be read from the physical user volumes (step 315). The redo data may be applied to the beginning of the do stream and do meta data stream (step 320). The data read from the undo journal may be applied to the physical user volume (step 325). The data may be freed from the undo data and meta data journals (step 330). A determination may be made if the image is at the request point (step 335). If the image is at the request point, the volume may be exposed in virtual accesses mode and the process may end (step 340). If the image is not at the requested point, the process may repeat. In other embodiments, if the selected image is after the current image, the image will be rolled forward using the DO stream. In most embodiments, once the roll completes, the system may expose the volume to the hosts and users may access the volume, the system creates a new empty data structure to contain the changes to be applied to the volume. The volume may now be in a virtual access mode.

Figure 5:
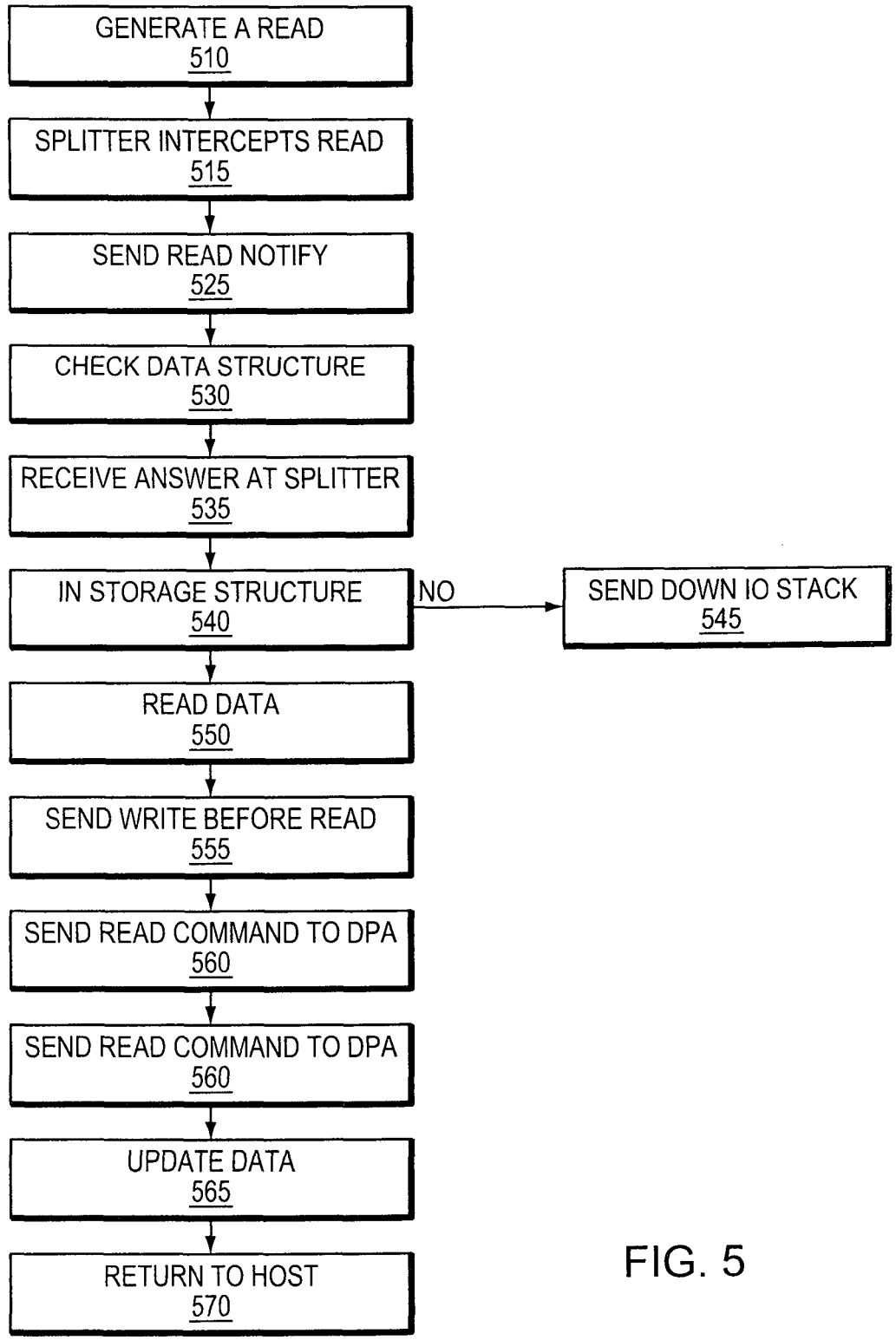
FIG. 5 is a simplified illustration of a method of handling a read, in accordance with an embodiment of the present invention.

Refer now to the example embodiments of FIGS. 5 and 4. In the embodiments of FIGS. 5 and 4, a read may be sent to LUN 455 from host 465. Splitter in storage array 450 intercepts the IO. Host 465 generates a read IO (step 510). Splitter 445 in storage 450 intercepts the read command (step 515). Splitter 445 sends a read notify to DPA 440 (step 525). DPA checks the memory data structure to see if read has some data in the data structure (step 530). Splitter receives yes or no from splitter (step 535), through SCSI status of the read notify command. If the data is not in the DPA data structure (step 540), splitter sends the IO down the storage IO stack (step 545). If the data is in the storage structure (step 540), splitter reads the current data in the physical storage in the location the host requested to read (step 550). Splitter sends write before read command to the DPA (step 555). Splitter sends the read command to the DPA (560). DPA receives the write before read data and updates it with the journal or memory cache data (step 565). DPA returns the data to the host (step 570).

In some embodiments, writes may be journaled. In other embodiments, there may be journaling with a read cache. In further embodiments, there may be a mirroring cache and there may not be writing to the journal.

Figure 6:
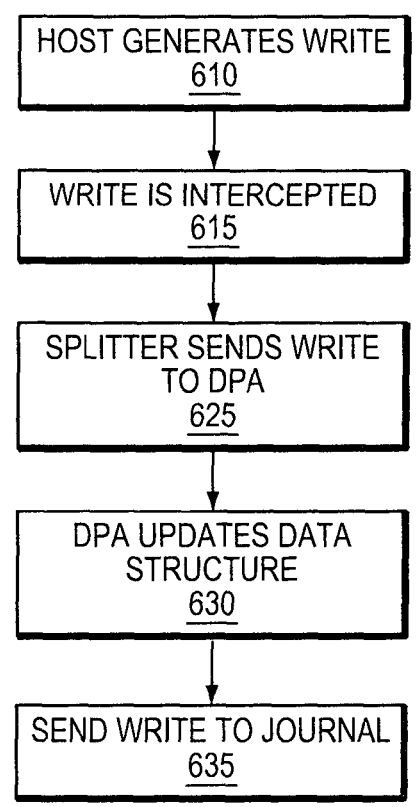
FIG. 6 is a simplified illustration of a method for handling writes, in accordance with an embodiment of the present invention.

Refer now to the sample embodiment of FIG. 6. FIG. 6 illustrates a sample method for handling writes. Host generates a write (step 610). The write is intercepted by a splitter (step 615). Splitter sends the write to DPA (step 625). DPA updates the virtual access data structure (step 630). DPA sends the write to the journal (step 635).

Figure 7:
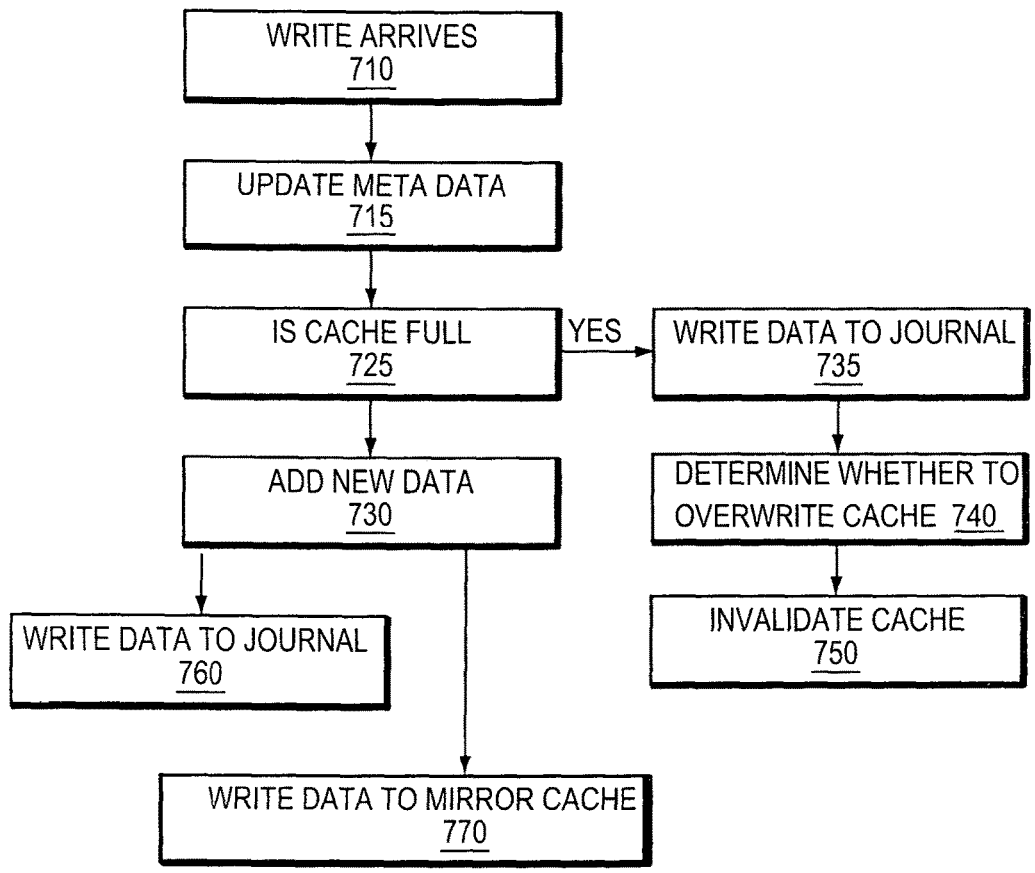
FIG. 7 is a simplified illustration of a method for write flow to a journal and cache, in accordance with an embodiment of the present invention.

Refer now to the sample embodiment of FIG. 7. FIG. 7 illustrates a sample write flow to a journal and cache. A write arrives at DPA (step 710). The meta data and data structure is updates (step 715). Determine if the cache is full (step 725). If cache is not full and image access journal is empty add new data to cache (step 730), data may be written to the journal (760) or to a mirror of the cache in a second appliance (770). If cache is full, or image access journal not empty, write new IO to journal (735), if data overwrites data which is in the cache (740), invalidate the cache area (750)

Figure 8:
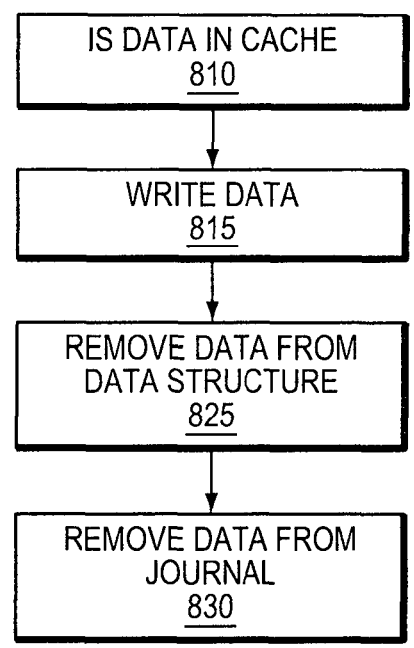
FIG. 8 is a simplified illustration of a method of rolling data, in accordance with an embodiment of the present invention.

Refer now to the embodiment of FIG. 8. The embodiment of FIG. 8 describes rolling the data. In the embodiment of FIG. 8, the DPA will repeatedly roll the data from the cache and the journal to the user volumes. A determination is made if there is data in the cache (step 810). The data is written to the user volume (step 815). Old data is removed from the cache and data structure (step 825). Once rolled to the user volume data is removed from the journal (step 830).

Figure 9:
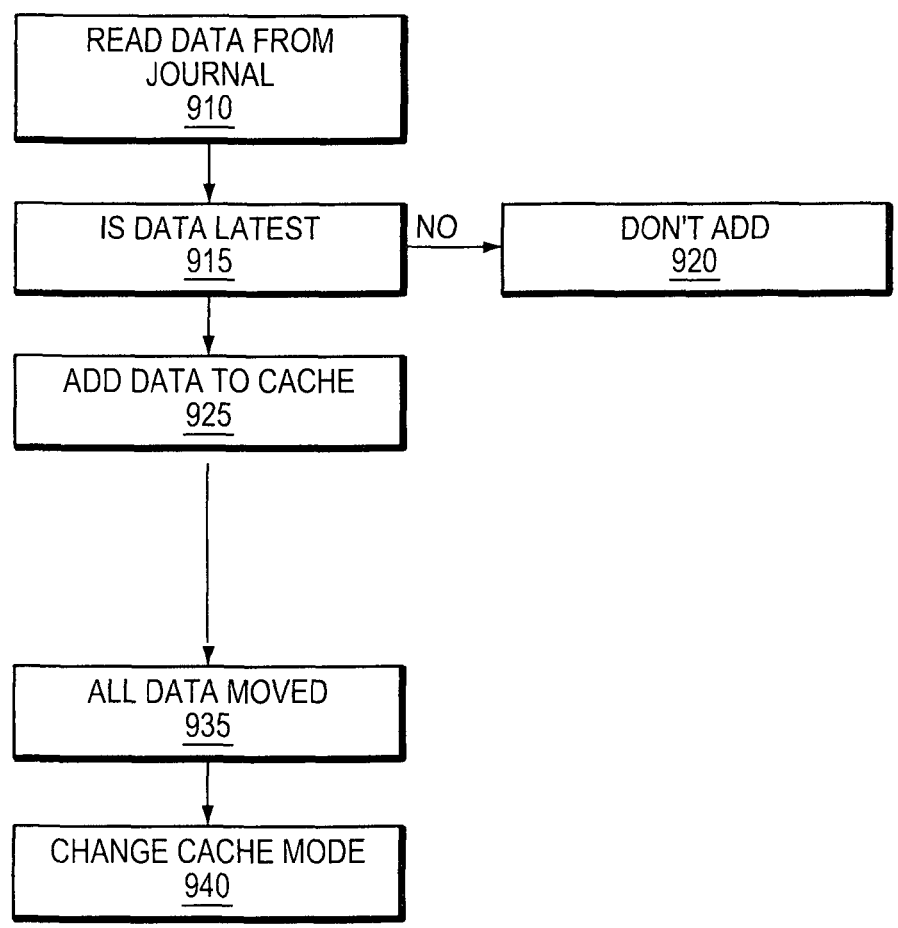
FIG. 9 is a simplified illustration of a method of moving data, in accordance with an embodiment of the present invention.

Refer now to the example embodiment of FIG. 9. In the example embodiment of FIG. 9 data is moved from the journal to the cache. Data is read from the journal which was not yet put in the cache (step 910). A determination is made if this is the latest data (step 915) i.e, if there is no newer update to the same location in the volume. If the data is not the latest it is not added to the cache (step 920). If the data is the latest it is added to the cache (step 925). A determination is made if all the data is moved to the cache (step 935). If all the data is moved, the cache is put in a new mode where IOs may enter the cache (step 940).

In some embodiments, the volume may be moved to the latest point in time. In certain embodiments, the system may also implement a mirrored write cache mechanism. In these embodiments, when a write arrives if cache is not full, the write may be written to both local cache and the cache of another DPA. In these embodiments, the write may not be written to journal, unless the cache is full.

Figure 10:
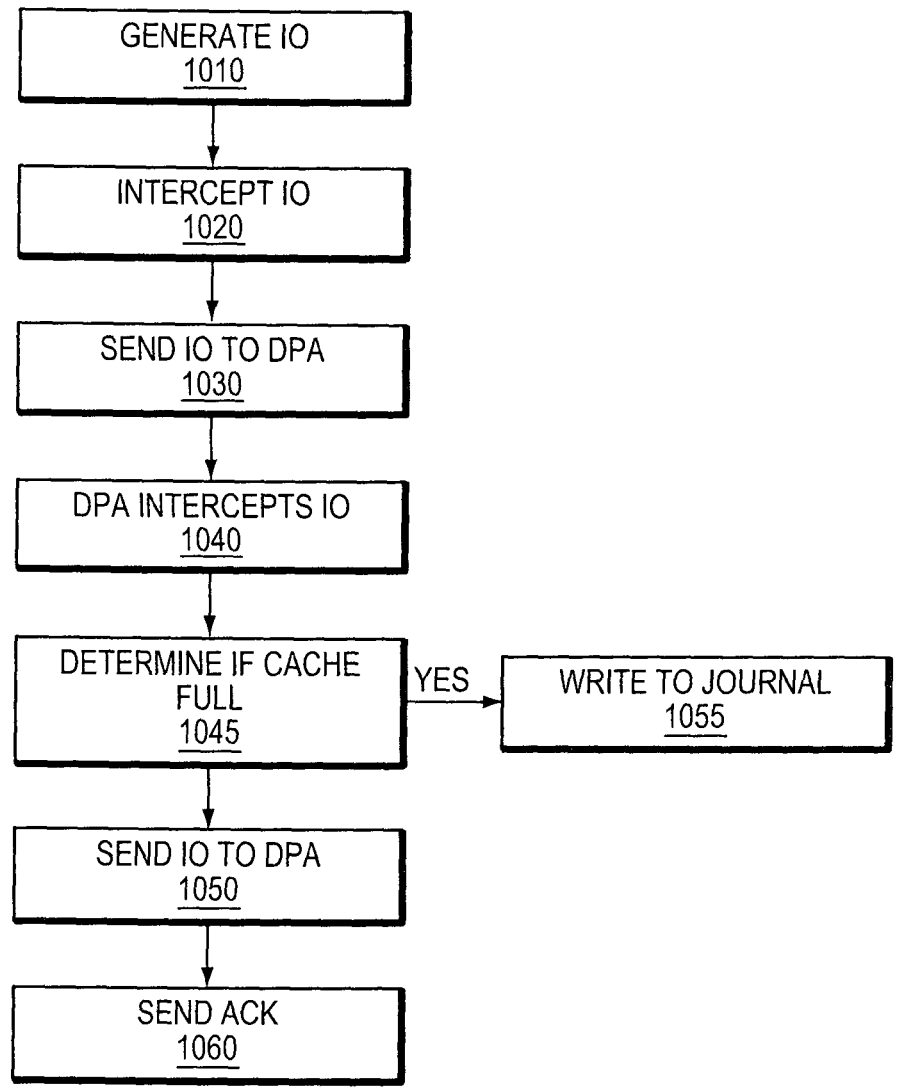
FIG. 10 is a simplified illustration of a method of handling IO, in accordance with an embodiment of the present invention.

Refer now to the example embodiment of FIG. 10. In the example embodiment of FIG. 10, a host generates an IO (step 1010). Splitter intercepts IO (step 1020). Splitter sends IO to DPA (step 1030). DPA intercepts IO (step 1040). A determination is made if the cache is full (step 1045). If the cache is not full, the IO is sent to a second DPA (step 1050) and the splitter acknowledges (step 1060). If the cache is full, the IO is written to the journal (step 1055) and the splitter acknowledges (step 1060).

In some embodiments, reads at the splitter may be optimized. In certain embodiments, to avoid access to the DPA, splitter may hold a small bitmap. In these embodiments, the bitmap may contain locations changes since last bitmap update. In some embodiments, the bitmap may be updated on any new write to the splitter, and periodically, the splitter may reread the bitmap from the DPA.

Figure 11:
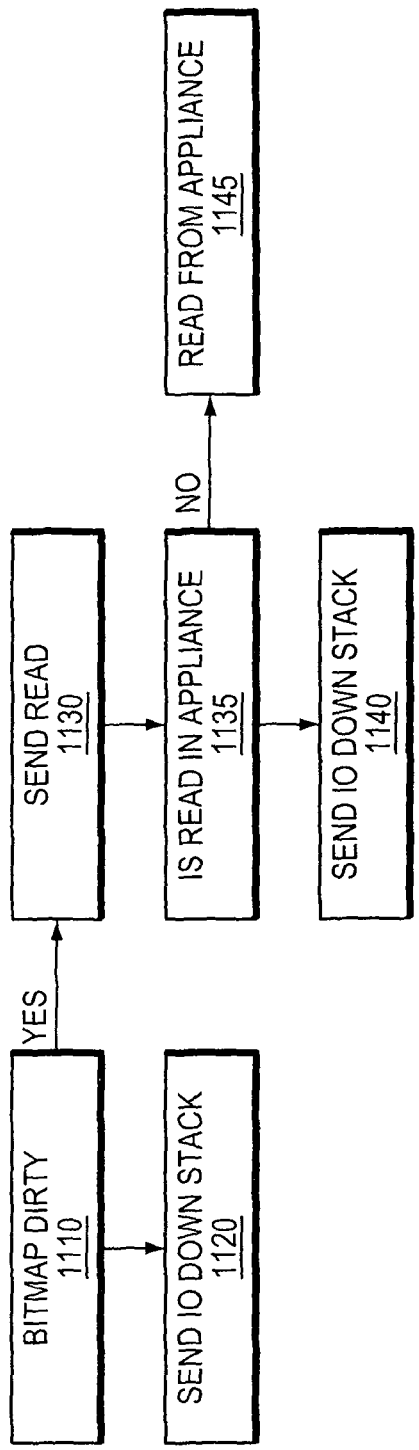
FIG. 11 is a simplified illustration of a method of a particular embodiment of implementing reads, in accordance with an embodiment of the present invention.

Refer now to the example embodiment of FIG. 11. The example embodiment of FIG. 11 describes a particular embodiment of reads. A determination is made if there is a dirty location in the bitmap (step 1110). If the bitmap is not dirty, read IO is sent down the stack (step 1120). If the bitmap is dirty, a read notification is sent to the appliance (step 1130). If the bitmap is dirty and the read is not in the appliance, then the IO is sent down the IO stack (step 1140). In other cases, the read is executed from the appliance in the same manner as in FIG. 5.

Figure 12:
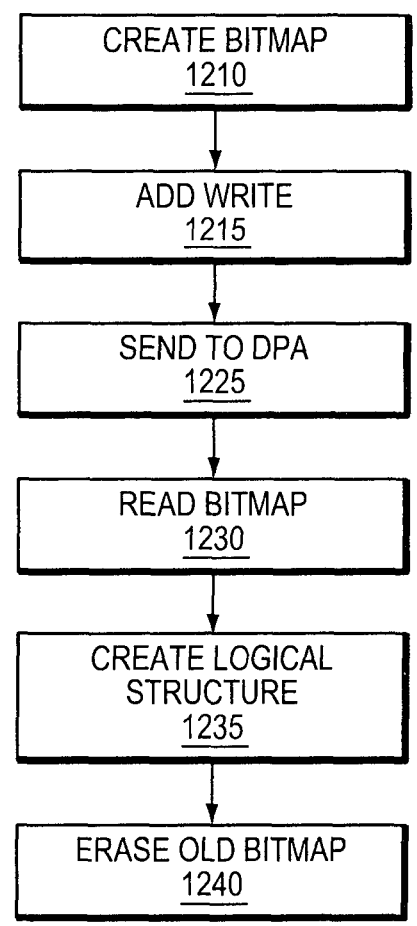
FIG. 12 is a simplified illustration of a method of updating a protocol for the bitmap, in accordance with an embodiment of the present invention.
Figure 13:
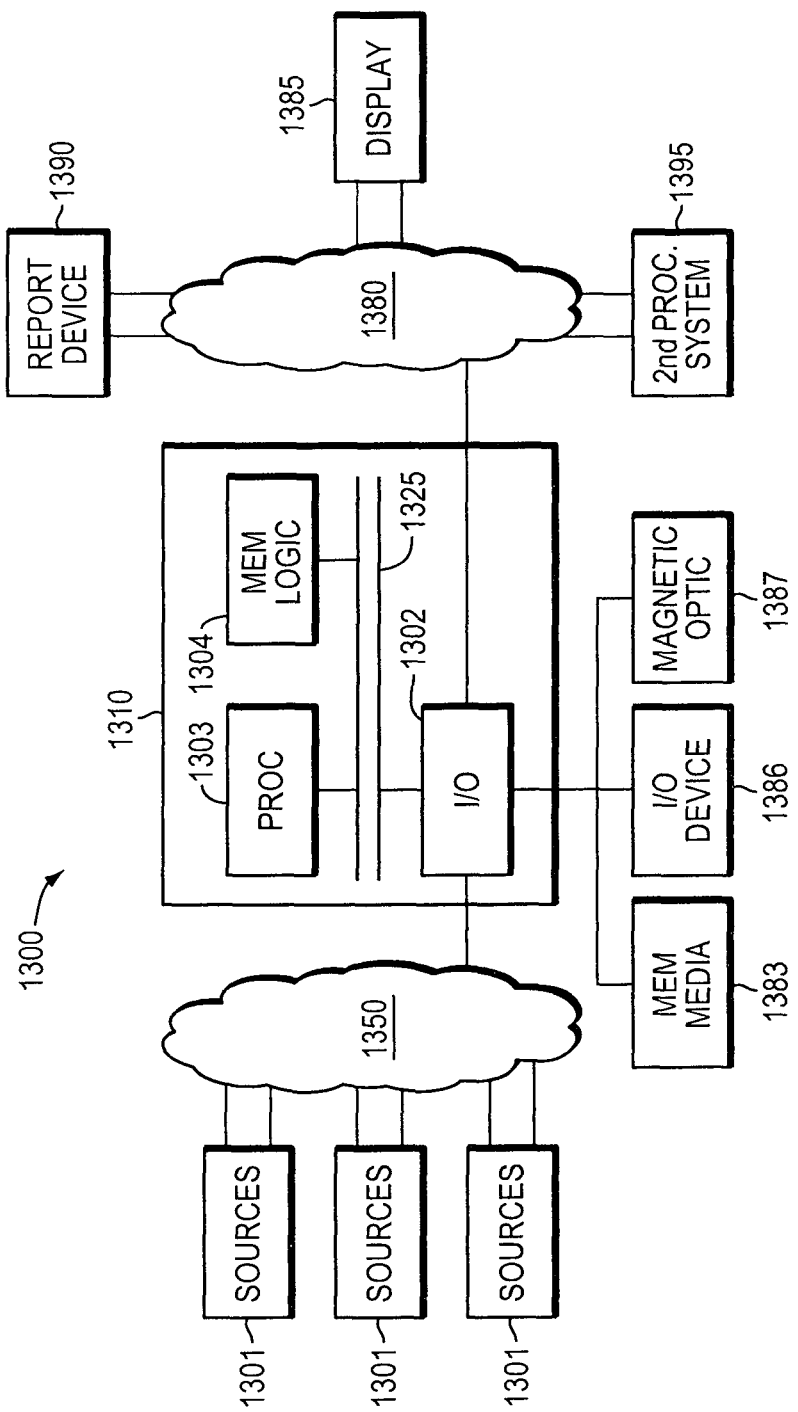
FIG. 13 is an example of an embodiment of an apparatus that may utilize the techniques described herein.
Figure 14:
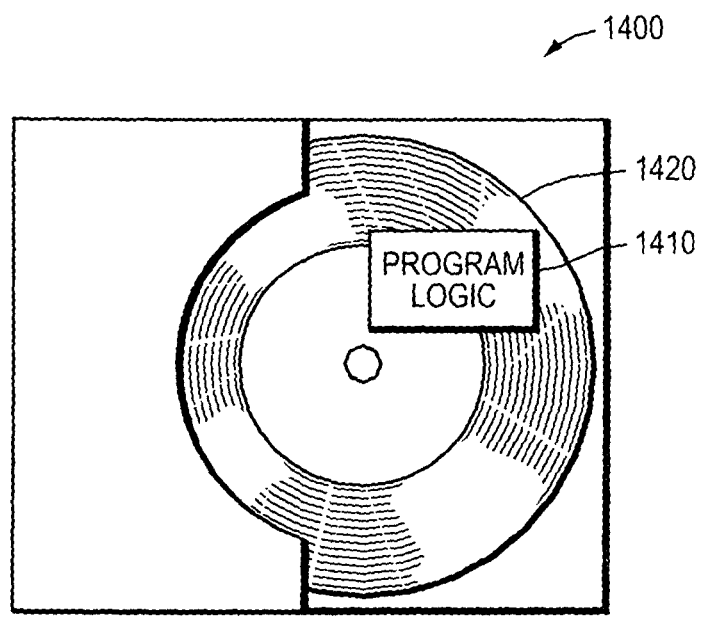
FIG. 14 is an example of an embodiment of a method embodied on a computer readable storage medium that may utilize the techniques described herein.

Refer now to the example embodiment of FIG. 12. The example embodiment of FIG. 12 describes a sample update protocol for the bitmap. Splitter creates a new empty bitmap (step 1210). Writes are added the write to the bitmap (step 1215). Reads to dirty locations in the new or old bitmap are sent to the DPA (step 1225). Splitter reads current bitmap from DPA (step 1230). Splitter merges structure of the data read from the splitter and the new bitmap (step 1235). Splitter erases old bitmap (step 1240). In some embodiments, the splitter may have limited memory and the bitmap update protocol may be computationally or memory expensive. In certain embodiments, the splitter bitmaps may be small, i.e. at the range of thousands of bits. In at least some embodiments, the bitmap updates will happen periodically.

The methods and apparatus of this invention may take the form, at least partially, of program code (i.e., instructions) embodied in tangible, non-transitory media, such as floppy diskettes, CD-ROMs, hard drives, random access or read only-memory, or any other machine-readable storage medium. When the program code is loaded into and executed by a machine, such as the computer of FIG. 11, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 12 shows Program Logic 1210 embodied on a computer-readable medium 1230 as shown, and wherein the Logic is encoded in computer-executable code configured for carrying out the reservation service process of this invention and thereby forming a Computer Program Product 1200.

The logic for carrying out the method may be embodied as part of the aforementioned system, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. Thus it may be appreciated that, in addition to data replication systems, the optimal journaling policy of the present invention has widespread application to journaling systems including database systems and version control systems.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:
1. A system for data replication, the system comprising:
a splitter;
a non-transitory storage medium;
a journal based replication appliance;
a journal; and
computer-executable logic operating in memory, wherein the computer-executable program logic is configured for execution of:
receiving a request to roll an image to a point in time;
reading data from the journal;
applying data from the journal to create an asynchronous copy on write image at the requested point in time, creating a virtual image data structure, wherein the virtual image data structure includes a reference to a write cache on the journal based replication appliance, a metadata part, and a reference to the asynchronous copy on write image;
presenting the virtual image data structure as the requested point of time; and
allowing writes to the request point in time be cached in the write cache of the virtual image data structure on the journal based replication appliance;

intercepting a read IO to the virtual image data structure at the splitter;
sending IO to the journal based replication appliance;
determining if the read IO is in the virtual image data structure;
based on a negative determination, sending the read down an IO stack of the splitter; and
based on a positive determination, sending a write before read command from the splitter to the journal based replication appliance; and
reading data to service the IO from the write cache of the journal based replication appliance.

2. The system of claim 1 wherein the logic is further configured for execution of:
determining if the write cache is full;
based on a determination that the write cache is full, writing the data to the journal; and
based on a determination the write cache is not full, either mirroring the data to a second replication appliance or adding data to the write cache and writing it to the journal.

3. The system of claim 1 wherein the logic is further configured for execution of:
intercepting a write IO to the virtual image data structure;
sending the write IO to the journal based replication appliance; and
updating the virtual image data structure; wherein the metadata part enables the journal based replication appliance to build reads from the write cache, journal, and the asynchronous copy on write image; wherein the metadata part indicates where data corresponding to the read is stored.

4. The system of claim 2 wherein the logic is further configured for execution of:
based on a determination that the write cache is full, determining if an IO is for a location in the write cache;
based on a positive determination that the IO was for the write cache, invalidating the write cache for the location.

5. The system of claim 2 wherein the logic is further configured for execution of:
applying data from the cache to the storage mediums volumes to free data from the write cache; and
transferring data from the journal to the write cache.

6. The system of claim 2 wherein the logic is further configured for execution of:
upon transferring the data from the journal to the write cache, allowing new IO to enter the write cache.

7. The system of claim 1 wherein the logic is further configured for execution of:
determining whether a read is in the virtual image data structure;
based on a positive determination, reading the read from the virtual image data structure in the write cache of the journal based replication appliance; and
based on a negative determination, reading the read from the journal.

8. The system of claim 2 wherein the logic is further configured for execution of:
creating a change bitmap in a memory of the splitter;
determining if a read is in a location indicated as not changed in bitmap; and
based on a positive determination, sending the read down the IO stack.

9. The system of claim 8 wherein the logic is further configured for execution of:

receiving a write in the splitter; and
updating the change in bitmap in the splitter memory.

10. The system of claim 8 wherein the logic is further configured for execution of:
periodically creating a new change bitmap, and updating new writes in new bitmap;
reading the change bitmap from the DPA, and merging into the new change bitmap;
erasing the old change bitmap; and
setting the new change bitmap as the change bitmap.

11. A computer implemented method for data replication, the method comprising:
receiving a request to roll an image to a point in time;
reading data from a journal;
applying data from the journal to create an asynchronous copy on write image at the requested point in time, creating a virtual image data structure, wherein the virtual image data structure includes a reference to a write cache on the journal based replication appliance, a metadata part; and a reference to the asynchronous copy on write image;
presenting the virtual image data structure as the requested point in time; and
allowing writes to the requested point in time be cached in the write cache of the virtual image data structure on the journal based replication appliance;
intercepting a read IO to the virtual image data structure at the splitter;
sending IO to the journal based replication appliance;
determining if the read IO is in the virtual image data structure;
based on a negative determination, sending the read down an IO stack of the splitter; and
based on a positive determination, sending a write before read command from the splitter to the journal based replication appliance; and
reading data to service the IO from the write cache of the journal based replication appliance.

12. The method of claim 11 further comprising:
determining if a write cache is full;
based on a determination that the write cache is full, writing data to the journal; and
based on a determination the write cache is not full, either mirroring the data to a second replication appliance or adding data to the write cache and writing it to the journal.

13. The method of claim 11 further comprising:
intercepting a write IO to the virtual image data structure;
sending the write IO to a journal based replication appliance; and
updating the virtual image data structure; wherein the metadata part enables the journal based replication appliance to build reads from the write cache, journal, and the asynchronous copy on write image; wherein the metadata part indicates where data corresponding to the read is stored.

14. The method of claim 12 further comprising:
based on a determination that the write cache is full, determining if an IO is for a location in the write cache;
based on a positive determination that the IO was for the write cache, invalidating the write cache for the location.

15. A computer program product comprising:
a non-transitory computer readable medium encoded with computer executable program code for implementing consistent snapshots in a replication environment, the replication environment having a production site and a splitter, the production site having storage mediums, the code:

receiving a request to roll an image to a point in time;

reading data from a journal;

applying data from the journal to create an asynchronous copy on write image at the requested point in time, creating a virtual image data structure, wherein the virtual image data structure includes a reference in a write cache on the journal based replication appliance, a metadata part; and a reference to the asynchronous copy on write image;

presenting the virtual image data structure as the requested point in time; and allowing writes to the requested point in time be cached in the write cache of the virtual image data structure on the journal based replication appliance;

intercepting a read IO to the virtual image data structure at the splitter;

sending IO to the journal based replication appliance;

determining if the read IO is in the virtual image data structure;

based on a negative determination, sending the read down an IO stack of the splitter; and based on a positive determination, sending a write before read command from the splitter to the journal based replication appliance; and reading data to service the IO from the write cache of the journal based replication appliance.

16. The computer program product of claim 15, wherein the code further enables:

determining if a write cache is full;

based on a determination that the write cache is full, writing data to the journal; and based on a determination the write cache is not full, either mirroring the data to a second replication appliance or adding data to the write cache and writing it to the journal.

17. The computer program product of claim 15, wherein the code further enables:

intercepting a write IO to the virtual image data structure;

sending the write IO to a journal based replication appliance; and updating the virtual image data structure; wherein the metadata part enables the journal based replication appliance to build reads from the write cache, journal, and the asynchronous copy on write image; wherein the metadata part indicates where data corresponding to the read is stored.

* * * * *